T. POWELL.

HAY AND GRAIN ELEVATOR.

No. 7,332. Reissued Oct. 3, 1876.

Witnesses
Geo. H. Strong
Alwyn T. Stacy

Inventor
Thomas Powell
By his Att'ys
Dewey & Co.

N. PETERS, PHOTO-LITHOGRAPHER, WASHINGTON, D. C.

UNITED STATES PATENT OFFICE.

THOMAS POWELL, OF STOCKTON, CALIFORNIA.

IMPROVEMENT IN HAY AND GRAIN ELEVATORS.

Specification forming part of Letters Patent No. 162,307, dated April 20, 1875; reissue No. 7,332, dated October 3, 1876; application filed September 4, 1876.

*To all whom it may concern:*

Be it known that I, THOMAS POWELL, of Stockton, in the county of San Joaquin and State of California, have invented a new and Improved Hay and Grain Elevator, of which the following is a specification:

My invention relates to certain improvements in that class of devices for unloading wagons in which a netting or other false bottom is spread over the bottom of a wagon-bed before the load is deposited in it, and afterward gathered around and above the load, so that the entire load can be removed from the wagon at a single operation by hoisting the netting with its contained load by means of a derrick over the spot where the load is to be dumped, and then allowing it to escape from the netting.

The most approved style of netting or false bottom is made in two parts, and these parts are united by some suitable detaching device at the middle of the netting, so that when the load has been lifted from the wagon and brought over the place where it is to be dumped the line of attachment will be under the load. By releasing the connecting device the parts then separate so as to allow the load to fall between the separated edges.

My improvement relates to the connecting and detaching devices which are used for fastening together and liberating the united edges of the netting; and consists in the devices hereinafter described.

Figure 1:
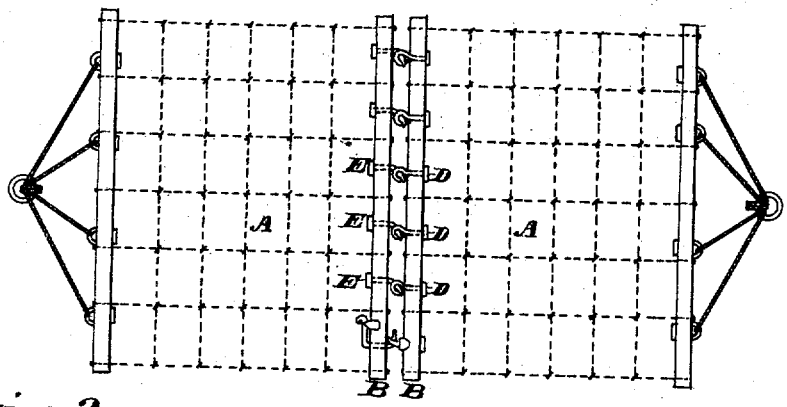
Figure 2:
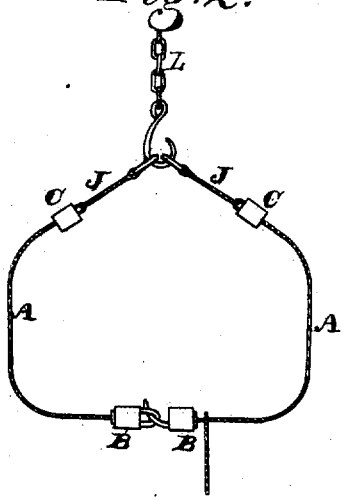
Figure 3:
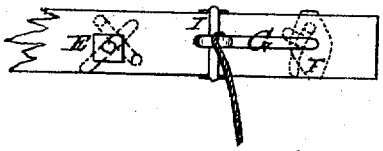
Figure 6:
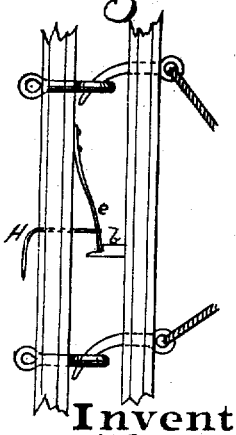
Figure 5:
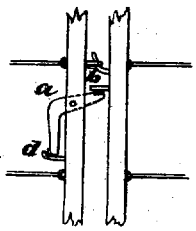
Figure 4:
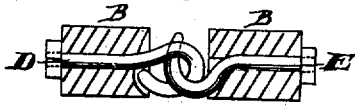

In the drawing, Figure 1 is a plan view of the netting extended. Fig. 2 is a side view of the netting when suspended from the hoisting chain or rope L. Fig. 3 is a side elevation of one of the middle stretcher-bars. Fig. 4 is a cross-section of the two stretcher-bars, showing hook and eye connection. Fig. 5 shows a bell-crank device for locking the parts together. Fig. 6 shows a spring-locking device.

A A represent two sections of netting, canvas, leather, or other material suitable for constructing a sling which can be spread over the bottom of a wagon, and which will serve to hoist the load which may be placed in the wagon. B B are bars which bind the meeting edges of the sections A A at the middle of the netting. In order to provide a suitable connecting and detaching device for these two meeting edges I secure in one of the bars a number of angular hooks, E, and in the opposite bar I secure a corresponding number of eyes, D. The hooks E are so formed that their points stand obliquely outward or toward the opposing bar.

It will, therefore, be evident that if I simply enter the hooks E into the eyes D they will slip out in case a strain comes upon the netting or bars B B; but if, after entering the eyes in the hooks, I secure the bars together so that they cannot move longitudinally or parallel with each other in the direction in which the hooks point, I firmly connect the two parts together so that they cannot be displaced until this permanent fastening or locking device is released.

Various devices can be employed for locking the bars together after the hooks have been entered into the eyes. In the present instance I have represented two. The one shown at Fig. 5 consists of a bell-crank, *a*, attached to one bar, one end of which abuts against a stud, *b*, on the opposite bar, so as to prevent parallel motion of the bars, while its opposite end is retained by a spring-catch, *d*. A trip-cord is attached to the spring-catch, and extends to the hands of the operator, so that by releasing the spring-catch the bell-crank will be released, and the hooks will slip out of the eyes, thus detaching the bars and allowing the load to drop between the sections.

Fig. 3 represents an angular hook, F, which is arranged to revolve and lock into a hook, E, in place of one of the eyes, and by engaging in a contrary way to the other hooks will lock the parts together. This hook has a crank, G, for turning it by means of a trip-cord similar to that above described, so that by releasing the locking-hook the weight of the load will force the other hooks apart.

The principal feature of my invention, however, is the employment of the inclined or oblique hooks, arranged to interlock with the eyes D, in combination with a device of any suitable construction for preventing the bars from moving longitudinally.

Having thus described my invention, what I claim as new, and desire to secure by Letters Patent, is—

1. The inclined or oblique self-detaching hooks E, in combination with eyes D, and a detachable fastening for preventing the bars B B from moving longitudinally, substantially as and for the purpose described.

2. The sections A A, provided with hooks and eyes D E, and swivel-hook F, having crank G, catch I, and trip-cord H, all arranged as shown and described.

THOS. POWELL.

Witnesses:
JOSEPH H. BUDD,
JOSHUA B. WEBSTER.